July 14, 1959   F. D. BROWNHILL ET AL   2,894,389

TORQUEMETER

Original Filed Jan. 8, 1952

INVENTOR
FRANK DEVISON BROWNHILL ET AL

United States Patent Office 2,894,389
Patented July 14, 1959

2,894,389
TORQUEMETER

Frank Denison Brownhill, Rugby, and Reuel Duncan van Millingen, Ravensthorpe, England Original application January 8, 1952, Serial No. 265,484, now Patent No. 2,768,525, dated October 30, 1956. Divided and this application May 3, 1956, Serial No. 585,602

6 Claims. (Cl. 73—136)

The invention relates to an instrument for ascertaining small angular relative displacements on rotating bodies and is a division of our Patent No. 2,768,525.

This invention relates to torquemeters.

It is a main object of the invention to provide an instrument allowing the ascertaining of such angular relative displacements of the order of magnitude of 2° at speeds in the order of magnitude of 30,000 revolutions per minute on a scale of say 1000 divisions, enabling the ascertaining of such angular displacements to about 1 part in 5000, and preferably for ascertaining the torque transmitted by elastic shafting of known torsional stiffness by measuring the angular displacement (twist) produced by the said torque on the said shafting.

With this object in view, we provide a torquemeter, the main feature of which consists in that it comprises in combination: an even number of plane mirrors alternately rigidly connected to two zones of the rotating body liable of relative angular displacement and set at angles relative to each other reflecting in the course of rotation a fixed collimated beam of light directed on to one of the said mirrors an even number of times alternately by mirrors rigidly connected to one or the other of the said zones, the final reflection being away from the said rotating body in a plane of rotation thereof.

Other features of the invention will become apparent from the following description of some embodiments thereof given by way of example with reference to the accompanying drawings, in which.

Figure 1:
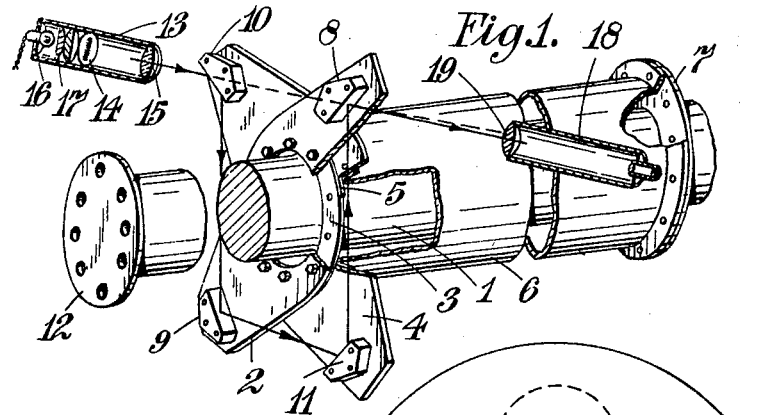
Fig. 1 is a perspective view, partly broken away, of a torquemeter instrument according to the invention.

Referring to Fig. 1, a torsionally elastic shaft 1 carries near one end a plate 2 rigidly bolted to a flange 3 which is integral with the shaft 1. A second plate 4 is supported on the circumference of the flange 3 by an anti-friction bushing 5, and is rigidly connected to the other end of the shaft 1 by means of a tube 6 and a flange 7 which is also integral with shaft 1.

Plate 2 carries a mirror 8, the plane reflecting surface of which is arranged radial to the axis of the shaft 1, and another mirror 9, the plane reflecting surface of which faces inwards towards the shaft 1, and similarly plate 4 carries one radial mirror 10 and one inward facing mirror 11. Torque is applied to a coupling 12 in a direction which is clockwise when looking at the coupling 12 in Fig. 1. The centers of the mirrors 8, 9, 10 and 11 lie in, and their surfaces are normal to a plane at right angles to the axis of rotation which also contains the optical axes of a collimator 13 and of a telescope 18.

The collimator 13 consists of a graticule or scale 14 of transparent lines on a dark ground placed at the exact focus of a lens 15 and illuminated by a lamp 16 through a condenser lens 17. With the shaft 1 in the position shown in Fig. 1, light from the collimator 13 strikes the mirror 10 at an angle of approximately 45° and is reflected by it on to and by the mirrors 9, 11 and 8 in that order. From the mirror 8 the light is reflected along the axis of the telescope 18 forming a real image of the graticule 14 at the exact focus of the object lens 19 of the telescope.

In other angular positions of the shaft 1 reached in the course of its rotation, light passes directly from the collimator 13 into the telescope 18 to form a real image identical in size with that formed by the light reflected in the manner described hereinabove. These two images coincide only when the mirrors are at angles relative to each other such that light passing from the collimator 13 to the telescope 18 by reflection on the mirrors 10, 9, 11, 8 suffers no angular deflection. Owing to the persistence of vision, both images appear to be continuous at speeds over about 200 revolutions per minute, and may be read one against the other.

Figure 2:
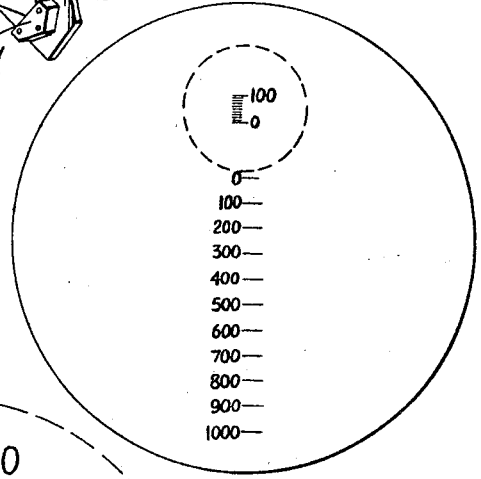
Fig. 2 is an end view of a detail of Fig. 1 on an enlarged scale.

For convenience in reading in this way, the graticule may take the form shown in Fig. 2, comprising a coarsely divided scale portion and a finely divided scale portion, the divisions of the said coarsely divided portion subtending equal angles of for example 0.4° at the lens of the collimator, and the extreme lines of the said finely divided scale portion subtending likewise the said angle. The distance between the uppermost division of the said coarsely divided portion and the lower extreme line of the said finely divided scale portion is made slightly larger than that between adjacent divisions of the said coarsely divided scale portion, say subtending an angle of 0.5°.

The uppermost division of the said coarsely divided scale portion is marked zero, the next one below: 100, then 200 and so on up to 1000, the figures being written preferably on the left hand side of the scale. The lowest and uppermost line of the finely divided scale portion, which is divided into 100 parts subtending equal angles, are numbered zero and 100 respectively, preferably on the right hand side of the scale.

Through the telescope 18 one observes the finely divided scale portion directly, the light bypassing the rotating mirrors, and the image of the coarsely divided scale portion, or part of it, by reflection in a box-like path.

The mirrors are set initially slightly out of parallel in the plane of rotation so as to bring the reflected image of the uppermost or zero line of the coarsely divided scale portion superimposed to the zero line of the directly observed image of the finely divided scale portion. This also removes the reflected image of the said finely divided scale portion from the field of view of the telescope.

Figure 2A:
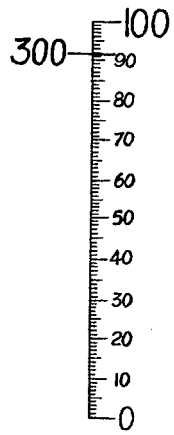
Fig. 2a is a detail of Fig. 2 on a scale still further enlarged.

Increasing torque changes the angle between the associated mirrors, since they are connected to opposite ends of the shaft 1, and the zero line of the coarsely divided scale portion appears to move upwards over the finely divided scale portion, the latter remaining stationary in the field of view. As the zero line of the coarsely divided portion reaches the top of the finely divided scale portion, it is replaced by the "one hundred" line, which at the same time reaches the bottom of the finely divided portion, climbs up over the said finely divided portion, and so on, the reading always being the "hundreds" of the division of the coarse scale portion actually superimposed to the finely divided portion and visible on the left hand side of the scale, plus the corresponding scale reading of the finely divided scale portion, the figures of which are on the right hand side of the scale. This is exemplified in Fig. 2a.

Figure 3:
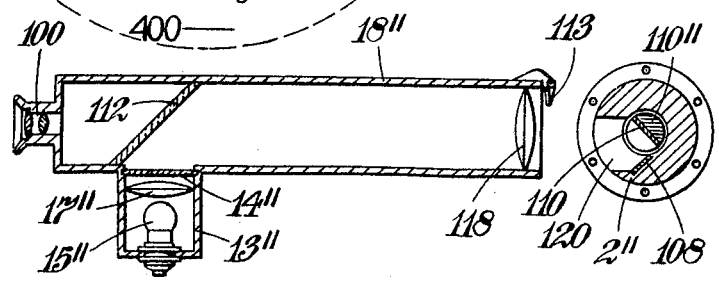
Fig. 3 is a longitudinal section through a combined collimator and telescope device, and a cross section of a modified form of torquemeter.

Another embodiment of a torquemeter instrument according to the invention is illustrated in Fig. 3. Here the torque-carrying member is a hollow elastic shaft and the torque-free member is a hollow sleeve arranged inside the shaft and connected rigidly to it by one end, the other end of the sleeve being free and carrying a rigid holder 110″.

In Figure 3, the collimator and telescope are combined into a single instrument: the condenser lens 17″ is arranged between the source of light 15″ and the graticule 14″, and this assembly 13″ is arranged laterally on the telescope 18″ between the eye piece 100 and the object lens 118 thereof, graticule 14″ being at the exact focus of lens 118 measured along a path including reflection through 90° by a half-silvered mirror 112, arranged inclined at 45° between the eye piece 100 of the telescope 18″ and the assembly 13″. A small plane mirror 113 faces part of the object lens 118 of the telescope 18″. The mirror 108 is attached to the rigid body 2″ adjacent a port 120, and the mirror 110 is attached substantially at right angles to the mirror 108 to the holder 110″ which is connected through the torque-free member to the opposite end flange of the torsionally resilient shaft.

Light from the assembly 13″ is reflected by the half silvered mirror 112 through the object lens 118 of the telescope 18″ which serves to collimate it. Part of this light is reflected directly by the mirror 113 and passes through the half silvered mirror 112 back towards the eye piece 100 of the telescope 18″. Another part of the collimated light falls in certain angular positions of the rotating parts on to mirror 108, is reflected by the same on to the mirror 110 and by the latter through the object lens 118 and the half silvered mirror 112 into the eye piece 100 of the telescope 18″. The real image of the graticule 14″ can accordingly be observed in the same field of vision reflected directly by the stationary mirror 113, and after an even number of reflections by the rotating mirrors 108, 110.

The angular position of the mirrors 108, 110 relative to one another is varied when torque is carried by the hollow shaft and their angular relative displacements can be measured accordingly as described.

While we have described and illustrated what may be considered typical and particularly useful embodiments of our invention, we wish it to be understood that we do not limit ourselves to the particular details and dimensions shown and described, for obvious modifications will occur to a person skilled in the art.

What we claim as our joint invention and desire to secure by Letters Patent is:

1. A torquemeter comprising a rotatable torque-carrying member, a first mirror rigidly secured to said torque member at a first location in its length, a second mirror having its reflecting surface approximately at right angles to the first mirror, the mirrors having their centers in the same plane transverse to the axis of the torque-carrying member and having their reflecting surfaces in planes parallel to the axis, torque-free means connecting said second mirror to said torque-carrying member at a second location axially spaced from said first location along the length of the torque-carrying member, and an external stationary combined light source and measuring means including a collimating lens, an illuminated object optically positioned at the focus of the lens, the lens directing a collimated beam of light towards the mirrors on the torque-carrying member, and image-receiving means also optically positioned at the focus of the collimating lens to receive in some angular positions of the torque-carrying member an image of the illuminated object after reflection of the beam of light in sequence by said mirrors on the torque-carrying member and passage of the finally reflected beam back through the collimating lens.

2. A torquemeter according to claim 1, wherein the illuminated object comprises a graticule located at the focus of the collimating lens and a lamp illuminating the graticule, said graticule having a first and coarsely-divided scale and a second and finely-divided scale spaced from the coarsely-divided scale, the length of the second scale being equal to a division on the first scale, and wherein there is provided a fixed mirror intercepting a part of the said beam of light and adapted to reflect the intercepted part of the beam back through the said collimating lens to produce in said image-receiving means an image of the second scale which is superimposed on an image of the first scale produced in said image-receiving means by the sequential reflection by the mirrors on the torque-carrying member, and which is traversed lengthwise by the image of the first scale on torque variation in said torque-carrying member.

3. A torquemeter comprising a stationary combined light source and measuring means comprising an eye piece positioned adjacent one end of the light source and measuring means, a collimating object lens positioned adjacent the opposite end of the light source and measuring means, and in visual alignment with the eye piece, a source of light, a graticule, a condenser lens arranged between the source of light and the graticule, said source of light, said graticule and said condenser lens being positioned laterally with respect to the eye piece and the object lens and arranged therebetween, a half silvered mirror disposed between said eye piece and said object lens and inclined at an angle of the order of forty-five degrees to said visual alignment and a plane mirror facing part of the object lens, a rotatable torque-carrying member, a first mirror rigidly secured to said torque member at a first location in its length, torque-free means connected to said torque-carrying member at a second location in its length, and a second mirror on said torque-free means, said second mirror having its reflecting surface at approximately right angles to the reflecting surface of said first mirror, said mirrors having their centers in the same plane transverse to the axis of the torque-carrying member and having their reflective surfaces in planes parallel to the axis, said mirrors being so disposed with respect to the combined light source and measuring means that light from said light source is reflected by the half silvered mirror through the collimating object lens, a part of said collimated light being reflected directly by the plane mirror and passing through the half silvered mirror back to said eye piece, another part of the collimated light falling in certain angular positions of the rotatable member upon said first mirror from which it is reflected upon said second mirror and being reflected by said second mirror through said object lens and the half silvered mirror into said eye piece whereby real images of said graticule can be observed in the same field of vision one of which images is due to the part of the beam reflected directly by said plane mirror and the other of which images is due to the part of the beam reflected by said first and second mirrors.

4. A torquemeter comprising an elastic torque-carrying shaft member, a bracket mounted in said shaft at a first location coaxially with the axis of rotation of the shaft to be angularly adjustable relative to the shaft at said first location, torsion-free means extending coaxially with the shaft member and connecting said bracket to said shaft member at a second location which is axially spaced from said first location, a pair of plane mirrors, one of said mirrors being mounted rigidly on said shaft at said first location and the other of said mirrors being rigidly mounted on said bracket, the mirrors having their centers in the same plane transverse to the axis of the shaft member and having their reflecting surfaces in planes parallel to the said axis, the plane of the reflecting surface of one mirror being approximately at right angles to the plane of the reflecting surface of the other of the mirrors, means directing a collimated beam of light towards said mirrors including a stationary collimating lens, a stationary source of light, a stationary graticule illuminated by said source of light and positioned at the focus of the collimating lens, the beam being reflected by one of said mirrors onto the second mirror which reflects the beam in turn, and image-receiving means optically aligned with said means directing the collimated beam towards the mirrors, said image-receiving means receiving the beam of light after reflection by said second mirror and including stationary measuring means permitting determination of the deflection of the image of the beam on angular rotation of said bracket relative to the shaft at said first location on variation of the torque transmitted through the shaft member.

5. A torquemeter according to claim 4, comprising third and fourth mirrors having their centers in said transverse plane and having their reflecting surfaces parallel to the said axis of the shaft member, the third mirror being rigidly mounted on said bracket with its reflecting surface radial to the said axis and reflecting the collimated beam of light leaving said collimating lens towards said mirror mounted on the shaft at said first location, and said fourth mirror being rigidly mounted on the shaft at said first location with its reflecting surface radial to the said axis, receiving the beam of light reflected by the second mirror and reflecting the beam away from the shaft towards said stationary measuring means.

6. A torquemeter as claimed in claim 4, said graticule having first and coarsely-divided scale and a second and finely-divided scale spaced from the coarsely-divided scale, the length of the second scale being equal a division of the first scale, and comprising also means directing to said measuring means a part of said collimated beam of light which is unreflected by the said pair of mirrors.

References Cited in the file of this patent

UNITED STATES PATENTS

| | | |
|---|---|---|
| 1,624,430 | Parsons et al. | Apr. 12, 1927 |
| 2,007,220 | Smith | July 9, 1935 |
| 2,073,206 | Guthrie et al. | Mar. 9, 1937 |
| 2,136,223 | Thomas | Nov. 8, 1938 |
| 2,402,856 | Turrettini | June 25, 1946 |